Patented Nov. 8, 1949

2,487,739

UNITED STATES PATENT OFFICE 2,487,739

GLUTAMIC ACID PURIFICATION PROCESS

Ralph W. Stenehjem and Robert E. Cox, San Jose, Calif., assignors to International Minerals and Chemical Corporation, a corporation of New York No Drawing. Application September 19, 1947, Serial No. 775,161

12 Claims. (Cl. 260—527)

The present invention relates to the process of purifying glutamic acid, more particularly to the process of purifying glutamic acid produced by the alkaline hydrolysis of concentrated Steffens filtrate. As used in this specification and accompanying claims the term glutamic acid or mono sodium glutamate is intended to refer specifically to the natural product 1(+) glutamic acid and its mono sodium salt.

Numerous processes have been devised in the past for the hydrolysis of either dilute or concentrated Steffens filtrate in order to recover therefrom the glutamic acid values contained therein. The glutamic acid so recovered is ordinarily of a low degree of purity and the quantity of glutamic acid so recovered is very often quite low. Since the mono sodium salt of glutamic acid has as one of its principal uses the incorporation thereof into various foods for human consumption, it is essential that glutamic acid and/or its mono sodium salt be of a relatively high degree of purity when sold on the market for culinary purposes. In the past various processes have been devised for the purification of glutamic acid and/or its mono sodium salt but these have all been quite expensive to operate and have involved the use of large quantities of relatively expensive reagents and, of course, have required extensive equipment installations as well.

It is an object of the present invention to economically and efficiently purify crude glutamic acid produced by the alkaline hydrolysis of concentrated Steffens filtrate.

It is a further object of the invention to eliminate, insofar as possible, impurities associated with crude glutamic acid in a more efficient and economical manner than has heretofore been thought feasible.

It is still a further object of the invention to economically purify crude glutamic acid in high yield and of high purity suitable for use as such or after conversion to its mono sodium salt in the pharmaceutical and culinary industries.

Other objects will be apparent upon a fuller understanding of the novel process as hereinafter described.

Concentrated Steffens filtrate, as received from various sugar beet factories, is filtered to remove any solids contained therein and subjected to an alkaline hydrolysis at a pH of about 12.5 or higher and at a temperature of between about 80 and about 95° C. for a period of time ranging between about 2 and about 3.5 hours. The alkali employed is generally caustic soda and the hydrolsis may be conducted under atmospheric pressure but if desired may also be carried out under super-atmospheric or sub-atmospheric pressure. Immediately after hydrolysis the hydrolysate is cooled to a temperature of between about 30 and about 45° C. and either directly or indirectly neutralized with hydrochloric acid or other suitable nonoxidizing mineral acid to a pH of between about 5 and about 6 or to a pH of between about 0.5 and about 1.5. The acidified hydrolysate is then evaporated at least to the point where inorganic salt crystals are formed, filtered and the acidity re-adjusted with hydrochloric acid to a pH of about 3.2 or in the case of neutralization to pH 0.5 to 1.5, the pH is adjusted with NaOH or NH3 after which crude glutamic acid is crystallized from the filtrate at approximately room temperature over a period of several days which permits the crystals to grow to relatively large size. Crystals are then centrifuged from the mother liquor, washed, repulped using a minimum amount of liquid, centrifuged and either dried or slurried as desired. The process of the present invention relates to the purification of such a crude glutamic acid.

In the past such crude glutamic acid has been purified followed by dissolving the crude glutamic acid in a solution of an alkali by treatment of the nearly neutral solution with a de-colorizing agent such as activated carbon, said solutions having a pH ranging between about 5 and about 6.5 more-or-less. But it has been discovered that the crystal growth and filtration of glutamic acid crystals obtained from solutions purified in this manner are unsatisfactory. It has been discovered that a mixture of colloidal organic compounds is indigenous to glutamic acid prepared from Steffens filtrate and that these colloidal organic compounds are believed to inhibit the growth of glutamic acid crystals and, do in fact, present troublesome problems of filtration, washing and the like which has heretofore caused great difficulty in recovering economical yields of glutamic acid of high purity.

It has been discovered that whereas in prior practices glutamic acid produced from concentrated Steffens filtrate was purified by treatment with activated carbon in solutions of very slight acidity. These solutions i. e. solutions having a pH of about 5 to about 6.5 are conducive to the solution of the organic impurities and to the maintenance of the colloidal effect of these impurities in which condition the impurities are removed with difficulty. It has now been discovered that these impurities of colloidal nature may be coagulated or flocculated from crude solutions decidedly more acidic in character. In the process of the present invention the crude glutamic acid is slurred in fresh water or wash water from subsequent steps in the purification process and is dissolved therein while maintaining the solution at a pH of between about 0.4 and about 0.8, preferably about 0.6 and at this pH while the glutamic acid remains in solution either as such or as the hydrochloride (where hydrochloric acid is employed as the acidifying agent) the organic colloidal impurities (whose exact chemical character is so far unknown) remain in suspension and tend to coagulate and flocculate into a readily filtrable form, the precipitate being also easily washed and freed of mother liquor. It is upon these discoveries that the instant novel process is based. In the purification process as heretofore practiced, it has been discovered that organic impurities of a colloidal nature present inherently in these solutions tend to clog the pores of the filter medium and to block the surfaces of the decolorizing agents employed, thus tending to seriously interfere with efficient washing of filter cakes to free the same of mother liquors and, in general, promote an overall inefficient and troublesome process of purifying glutamic acid obtained in the alkaline hydrolysis of concentrated Steffens filtrate.

It has now been discovered that if a solution of crude glutamic acid of the type described is dissolved in an aqueous medium having a pH below about 1.0 for example, ranging between about 0.4 and about 0.8, preferably about 0.6, colloidal organic impurities are flocculated in such a form as to be readily removable from the solution by simple filtration means, either simultaneously with a filtration to remove the decolorizing agent or by a separate filtration prior thereto. Activated carbon or other suitable decolorizing agent may be used to treat the solution to effectively remove the color bodies therein in such a manner that the pores of the decolorizing agent are not clogged up or blocked by the colloidal impurities that have been flocculated so that the same or higher degree of purity of final product heretofore attained may now be attained using as little as one-half as much decolorizing agent over that previously customarily employed. In other words, the same or a higher degree of purity of glutamic acid product may be attained through the use of even less de-colorizing agent per unit of crude glutamic acid processed than has heretofore been thought feasible or possible, without sacrificing in any way either the amount of glutamic acid recovered or the purity thereof. In fact, the flocculation and subsequent separation of the colloidal impurities is readily accomplished without the use of any decolorizing agent whatsoever by using only a relatively small amount of filter aid such as any one of the commercially available aids now being marketed. A substantial, though not complete, decolorization of the crude glutamic acid is accomplished by this last mentioned process.

Not only is there an immediate economical effect to be noted through the use of a pH of between about 0.4 and about 0.8 as stated but in addition there is an overall advantage in the purification process in cases where the purified glutamic acid is to be directly used as a feed material in the production of mono sodium glutamate. In such a combination of processes the purified glutamic acid is treated with sufficient 50% aqueous caustic soda solution to give a pH of about 7 to the solution, simultaneously therewith decolorizing agents are added and the mixture maintained at between about 50 and about 60° C. with agitation for a short period after which it is filtered, the filtrate concentrated, and mono sodium glutamate crystallized therefrom. The filter cake which contains quantities of only partially spent de-colorizing agent together with filter aid, if it has been employed, may be washed free of entrained liquor and employed as a de-colorizing agent, if one is used, in the purification of the crude glutamic acid. By employing a pH of between about 0.4 and about 0.8 during the glutamic acid purification process and when employing de-colorizing agent in said process, mono sodium glutamate produced from the purified glutamic acid may be of the required degree of purity even though the combined quantities of activated carbon used in the mono sodium glutamate process and in the glutamic acid purification process is only 50% of the total amount of activated carbon heretofore employed in these two operations.

More specifically the process of the instant invention may be described in the following manner:

Crude glutamic acid obtained from the alkaline hydrolysis of concentrated Steffens filtrate and containing the heretofore mentioned inherent organic impurities is slurried with water or glutamic acid wash solutions from the subsequent washing of filter cake as hereinafter described. This slurry is then acidified with aqueous hydrochloric acid to a pH ranging between about 0.4 and about 0.8, preferably about 0.6. The mixture after adding thereto filter aid and optionally a de-colorizing agent such as activated carbon and after thorough agitation and heating for a short period of time at a temperature between about 35 and 50° C., though this temperature range is not critical, has the solids separated from the mixture in any convenient manner such as for example centrifuging or filtering, preferably the latter. The heating of the slurry, prior to solids separation treatment, has a tendency to accelerate the coagulation and flocculation of the colloidal organic impurities and to facilitate their ultimate removal from the liquid composition and the washing of the solid cake to free the same of mother liquor. The solid cake separated is then washed with water to free the same of mother liquor and it is these washings which may be used at the beginning of the process for slurrying and dissolving the fresh crude glutamic acid being processed.

The filtrate is then treated with aqueous caustic soda or, if the purification process is being operated in conjunction with the production of mono sodium glutamate, the filtrate from the final crystallization of mono sodium glutamate crystals may be employed in whole or in part as the neutralizing agent and as a substitute for the caustic soda solution. The caustic or mono sodium glutamate filtrate is added in sufficient quantities to give a final pH to the solution of between about 3.1 and about 3.3, preferably about 3.2 after which the solution is allowed to stand, with mild agitation, at approximately room temperature for a period ranging between about 0.5 and about 1.5 days to permit adequate crystal growth of glutamic acid. The slurry is then centrifuged or filtered as desired, the crystal cake washed with water and the crystals either dried, packaged and marketed as such or introduced as feed material into a process for the production of mono sodium glutamate as previously described.

Example 1

About 51 pounds of dry crude glutamic acid cake of about 78% purity and being substantially free of mother liquor was slurried with fresh water and sufficient 34% hydrochloric acid was added to produce a pH of about 0.6 in the solution while having a final concentration of about 13 to about 14% glutamic acid. To the solution, maintained at about 40° C., there was added about 14 pounds of a filter aid and the solution was agitated for between about 15 and about 20 minutes after which the slurry was filtered. The filter cake was washed with water (these washings being used in making up succeeding batches of slurried crude glutamic acid for treatment) and the filtrate was partly neutralized, with agitation, with sufficient 50% aqueous caustic soda to give a pH of about 3.2 to the solution. This solution was then allowed to stand with slow agitation at room temperature for about 12 hours or more (in this experiment, about 18 hours) in order to crystallize out the purified glutamic acid crystals. The resultant slurry was then centrifuged, the cake water washed, and spun to dryness. About 36.5 pounds of wet cake was produced containing about 22 pounds on a dry basis of which about 94% was glutamic acid.

Example 2

A further run was made which was carried out substantially as set forth with respect to Example 1 except that the wash water obtained in the run represented by Example 1 was used to make up the feed slurry and about 31 pounds of activated carbon previously employed in the purification of a mono sodium glutamate solution and about 10 pounds of filter aid were also employed. Of the 65 pounds of dry solid crude glutamic acid having a 78% purity subjected to treatment, about 40 pounds of purified glutamic acid of about 96.6% purity was recovered.

Example 3

Another run was carried out in substantially the same manner as described in Example 1, except that the pH of the solution being treated ranged between about 5.7 and about 6.3, and fresh activated carbon to the extent of 31%, together with filter aid to the extent of 29% of the glutamic acid content of the feed was employed. About 54 pounds of 78% purity feed was introduced while only 19 pounds of 96% purity product was recovered in spite of the large quantity of de-colorizing agent employed as compared to the case in Example 1 wherein no fresh activated carbon was employed.

Example 4

About 10 pounds of crude glutamic acid substantially free of mother liquor was dissolved in about 11 pounds of water at a pH of about 0.6. Seven substantially equal portions of this solution were made and varied amounts of fresh activated carbon were added to each of the 7 portions except the first. Filter aid was employed in the same amount as the carbon except in the first wherein 0.06 pound of filter aid was employed, but no carbon. Each solution was then purified according to the previously described process and the resultant purified glutamic acid from each portion was then separately neutralized with aqueous caustic soda to a pH of about 7 and treated with fresh activated carbon in the amounts shown below; the slurry was then filtered in each instance and the color of the mono sodium glutamate solutions produced compared as between the various portions. It was found that the overall percentage of carbon employed as between the mono sodium glutamate carbon treatment and the crude glutamic acid carbon treatment could be materially reduced from portion No. 7 and still obtain a water white final solution from which the mono sodium glutamate could be crystallized if the original crude glutamic acid were purified from solutions maintained at a pH of about 0.6. The data are as follows:

| Portion No. | 1 | 2 | 3 | 4 | 5 | 6 | 7 |
|---|---|---|---|---|---|---|---|
| | Wt. percent based on mono sodium glutamate equivalents | | | | | | |
| Glutamic Acid Carbon | 0 | 5 | 10 | 15 | 20 | 25 | 30 |
| Mono Sodium Glutamate Carbon | 17.9 | 12.4 | 7.05 | 4 | 3.05 | 1.74 | 0.92 |

Example 5

Except that a pH was maintained at between about 5.7 and about 6.3, a further run was made using about 16 pounds (wet weight) of carbon cake containing about 3 pounds (dry weight) of partially spent carbon and about 3 pounds of a filter aid previously used in the preparation of mono sodium glutamate, together with about 16 pounds of fresh activated carbon and about 15 pounds of a filter aid. In other respects this run was carried out in a manner similar to the process described in Example 2, but it will be noted that about three-fourths of the carbon used was fresh carbon instead of using all partially spent carbon as was employed in Example 2. The purified product recovered from this conventional process amounted to about 28.5 pounds dry, and had a purity of about 95.5% from a feed of 65 pounds of dry crude glutamic acid of a purity of about 78%.

Having now thus fully described and illustrated the character of the present invention, what is desired to be secured by Letters Patent is:

1. A process of purifying crude glutamic acid produced by the alkaline hydrolysis of Steffens filtrate which comprises dissolving the said crude glutamic acid in water with the aid of a non-oxidizing mineral acid solution while employing a pH between about 0.4 and about 0.8, separating organic impurities from the slurry, adjusting the precipitate-free solution to a pH of between about 3.1 and about 3.3 with the aid of alkali, cooling, agitating the same and recovering purified glutamic acid crystals therefrom.

2. A process as in claim 1 wherein the alkali employed is at least partially a mother liquor from the crystallization of mono sodium glutamate.

3. A process of purifying crude glutamic acid produced by the alkaline hydrolysis of concentrated Steffens filtrate which comprises slurrying and dissolving the said crude glutamic acid in water with the aid of a non-oxidizing mineral acid solution while employing a pH of between about 0.4 and about 0.8 and adding a de-colorizing agent thereto, separating the organic impurities together with the added de-colorizing agent from the slurry, and recovering purified glutamic acid crystals therefrom.

4. A process of purifying crude glutamic acid produced by the alkaline hydrolysis of Steffens filtrate which comprises slurrying and dissolving the said glutamic acid in water with the aid of a non-oxidizing mineral acid while employing a pH of between about 0.4 and about 0.8 in the solution, separating organic impurities from the solution and recovering purified glutamic acid therefrom.

5. A process of purifying crude glutamic acid produced by the alkaline hydrolysis of concentrated Steffens filtrate which comprises slurrying and dissolving the said crude glutamic acid in water with the aid of a non-oxidizing mineral acid solution while maintaining a pH of between about 0.4 and 0.8, adding activated carbon thereto, separating organic impurities therefrom, adjusting the precipitate-free solution to a pH of between about 3.1 and about 3.3 with the aid of alkali, cooling, agitating the same and recovering purified glutamic acid crystals therefrom.

6. A process of purifying crude glutamic acid obtained from the alkaline hydrolysis of concentrated Steffens filtrate which comprises preparing a slurry of glutamic acid and water, adjusting the acidity of the composition to a pH of between about 0.4 and about 0.8 with hydrochloric acid, separating organic impurities therefrom, adjusting the precipitate-free solution to a pH between about 3.1 and about 3.3 with the aid of caustic soda, cooling the composition, slowly agitating the same and thereby crystallizing glutamic acid therefrom.

7. A process as in claim 6 wherein activated carbon is added prior to the separation of organic impurities.

8. A process of purifying crude glutamic acid obtained by the alkaline hydrolysis of concentrated Steffens filtrate which comprises dissolving the crude glutamic acid in aqueous solution maintained at a pH of between about 0.4 and about 0.8 with the aid of hydrochloric acid, heating said solution to a temperature of between about 35 and about 50° C. for a sufficient length of time to effect substantial coagulation and flocculation of the colloidal organic impurities, filtering the composition, treating the filtrate with sufficient caustic soda to raise the pH to between about 3.1 and about 3.3, crystallizing glutamic acid from the solution and recovering purified glutamic acid crystals from the resultant slurry.

9. A process as in claim 8 wherein activated carbon is added prior to the separation of organic impurities.

10. A process of purifying crude glutamic acid obtained from the alkaline hydrolysis of concentrated Steffens filtrate which comprises preparing an aqueous slurry of said crude glutamic acid of at least 10% by weight glutamic acid concentration, adjusting the acidity of the composition to a pH of between about 0.4 and about 0.8 with hydrochloric acid, agitating and heating said composition at between about 35 and about 50° C. for a sufficient length of time to substantially flocculate colloidal organic impurities, separating organic impurities therefrom, adjusting the solids-free solution to a pH of between about 3.1 and about 3.3 with the aid of caustic soda, cooling the composition to between about 20 and about 30° C., slowly agitating the same and thereby crystallizing purified glutamic acid therefrom.

11. A process as in claim 10 wherein the pH of the original slurry is adjusted to about 0.6 maintaining a temperature of about 40° C. and activated carbon is added at about the same time as the pH is adjusted.

12. A process as in claim 10 wherein at least a portion of the caustic soda employed is replaced with mother liquor from the crystallization of mono sodium glutamate.

RALPH W. STENEHJEM.
ROBERT E. COX.

REFERENCES CITED

The following references are of record in the file of this patent:

UNITED STATES PATENTS

| Number | Name | Date |
|---|---|---|
| 2,380,890 | Waters | July 31, 1945 |